US012561094B2

(12) United States Patent
He et al.

(10) Patent No.: US 12,561,094 B2
(45) Date of Patent: Feb. 24, 2026

(54) DATA ACCESS METHOD AND RELATED DEVICE

(71) Applicant: Huawei Technologies Co., Ltd., Shenzhen (CN)

(72) Inventors: Xianjun He, Chengdu (CN); Zhaojiao Han, Shenzhen (CN); Bowei Yu, Chengdu (CN); Can Chen, Chengdu (CN); Chunyi Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/345,519

(22) Filed: Jun. 30, 2023

(65) Prior Publication Data

US 2023/0342087 A1 Oct. 26, 2023

Related U.S. Application Data

(63) Continuation of application No. PCT/CN2021/142495, filed on Dec. 29, 2021.

(30) Foreign Application Priority Data

Dec. 31, 2020 (CN) .......................... 202011645307.9

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/0635; G06F 3/067; G06F 13/128; G06F 13/1668; G06F 15/17331; G06F 13/28; G06F 3/0602
See application file for complete search history.

(56) References Cited

U.S. PATENT DOCUMENTS

| | | | |
|---|---|---|---|
| 8,595,385 B1* | 11/2013 | Shapiro | G06F 13/385 710/52 |
| 10,509,592 B1* | 12/2019 | Malwankar | G06F 3/0685 |
| 2014/0325013 A1* | 10/2014 | Tamir | G06F 3/0655 709/212 |
| 2016/0217104 A1 | 7/2016 | Kamble et al. | |

(Continued)

FOREIGN PATENT DOCUMENTS

| | | |
|---|---|---|
| CN | 101216811 A | 7/2008 |
| JP | 2018509674 A | 4/2018 |
| JP | 2019102083 A | 6/2019 |

OTHER PUBLICATIONS

Peng Long-gen et al. "Research of Message Scalable Technology over InfiniBand Network", Computer Science vol. 40 No. 3, Mar. 2013, with the Englsih Abstract, total 4 pages.

*Primary Examiner* — Francisco A Grullon
(74) *Attorney, Agent, or Firm* — Conley Rose, P.C.

(57) ABSTRACT

In a data access method, a network device receives access requests sent by a plurality of clients connected to the network device, and sends the access requests to an access queue of a storage unit. The storage unit executes the access requests in the access queue, and returns processing results of the access requests of the plurality of clients. The network device returns the processing results that are of the access requests and that are returned by the storage unit to the clients corresponding to the access requests.

24 Claims, 10 Drawing Sheets

(56)  References Cited

U.S. PATENT DOCUMENTS

| 2019/0163665 | A1  |        | 5/2019 | Kachare et al. |            |
| 2020/0242258 | A1* | 7/2020 | Smith  ...................... | H04L 63/10 |
| 2021/0303154 | A1* | 9/2021 | Zhang  ................... | G06F 3/0685 |

* cited by examiner

| 31–24 | 23–16 | 15–8 | 7–0 |
|---|---|---|---|
| Specific command | | | |
| Reserved | | | |
| SQ identifier | | SQ head pointer | |
| Status field | P | Command identifier | |

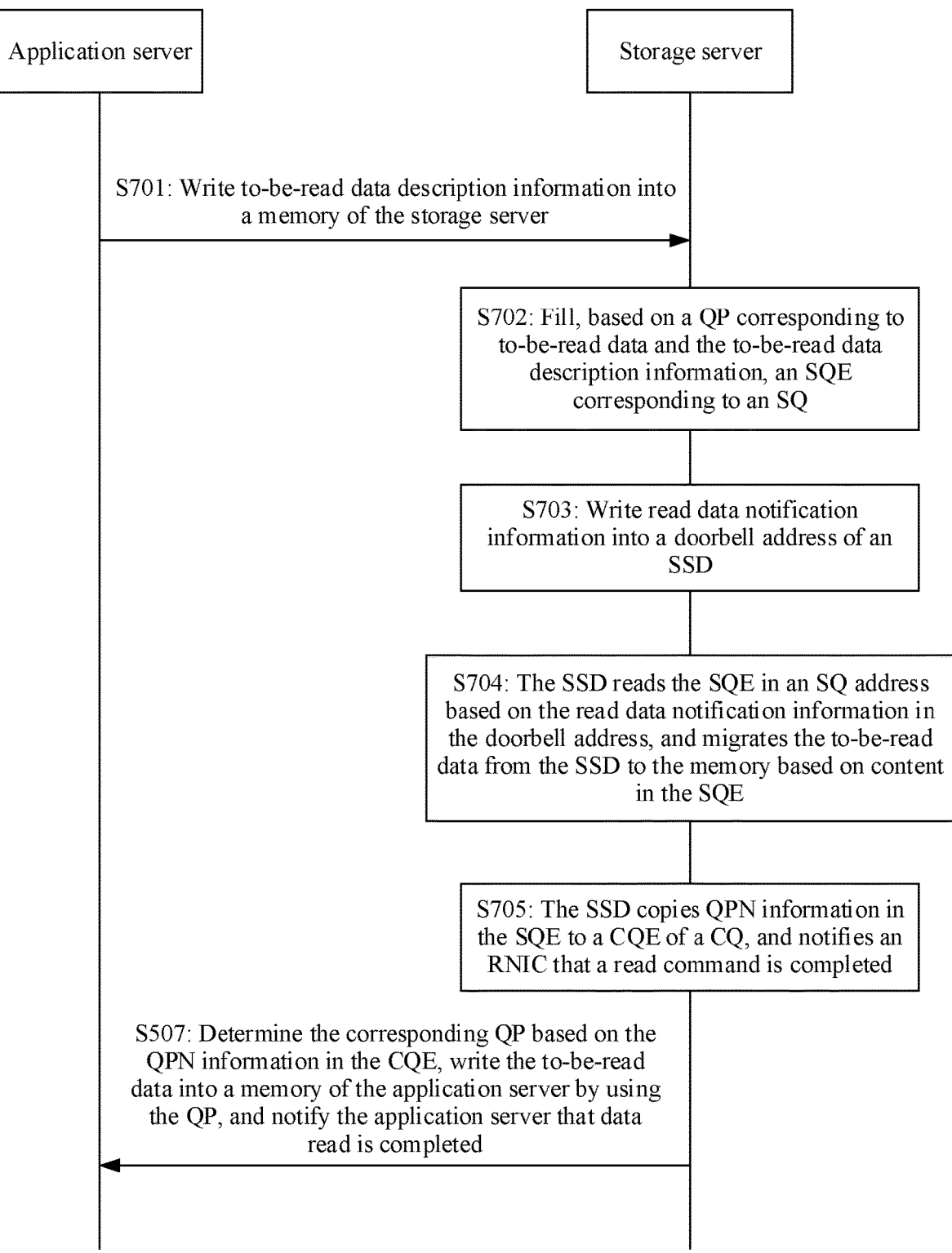

S701: Write to-be-read data description information into a memory of the storage server S702: Fill, based on a QP corresponding to to-be-read data and the to-be-read data description information, an SQE corresponding to an SQ S703: Write read data notification information into a doorbell address of an SSD S704: The SSD reads the SQE in an SQ address based on the read data notification information in the doorbell address, and migrates the to-be-read data from the SSD to the memory based on content in the SQE S705: The SSD copies QPN information in the SQE to a CQE of a CQ, and notifies an RNIC that a read command is completed S507: Determine the corresponding QP based on the QPN information in the CQE, write the to-be-read data into a memory of the application server by using the QP, and notify the application server that data read is completed

FIG. 7

DATA ACCESS METHOD AND RELATED DEVICE

CROSS-REFERENCE TO RELATED APPLICATIONS

This is a continuation of Int'l Patent App. No. PCT/CN2021/142495, filed on Dec. 29, 2021, which claims priority to Chinese Patent App. No. 202011645307.9, filed on Dec. 31, 2020, both of which are incorporated by reference.

FIELD

The present disclosure relates to the field of storage technologies, and in particular, to a data access method and a related device.

BACKGROUND

With rapid development of computer information technologies such as big data, cloud computing, and artificial intelligence in recent years, a scale of global Internet data increases exponentially. Many high-concurrency and low-latency applications require high-performance hardware, and therefore a high-performance memory emerges. For the high-performance memory, because an I/O throughput capability of the high-performance memory is strong, a distributed file system needs to allocate a large quantity of computing resources to complete data processing and data exchange. Consequently, a transmission latency of the system is increased and a network transmission capability and system performance are limited. To resolve this problem, remote direct memory access (RDMA) emerges. The RDMA is a technology for directly performing remote memory access. To be specific, data can be directly and quickly migrated from one system to another remote system memory without affecting an operating system. This reduces consumption of a central processing unit (CPU) in the data transmission process, releases a memory bandwidth, and improves service processing performance of the system. The RDMA features a high bandwidth, a low latency, and low CPU usage.

Currently, when the RDMA is used to read and write data, a network device of a host first writes the data into a memory of a storage device by performing an RDMA operation, and a CPU in the storage device needs to store the data in the memory into a persistent storage medium, for example, a solid-state drive (SSD). However, storing the data in the memory into the persistent storage medium by using the CPU needs to consume CPU resources. Consequently, communication between the host and the storage device is affected. In addition, because resources of a submission queue (SQ) and a completion queue (CQ) of the SSD are limited, the storage device can support only a few network device connections, and cannot support a large quantity of network device connections.

Therefore, how to directly store the data into the persistent storage medium by the network device of the host in a large-scale networking connection scenario, and reduce CPU usage of the storage device is an urgent problem to be resolved currently.

SUMMARY

Embodiments of the present disclosure disclose a data access method and a related device, to directly store data persistently in a large-scale networking connection, so as to reduce CPU usage of a storage device, and expand applicable scenarios.

According to a first aspect, a storage device includes a network device and a storage unit. The storage unit is connected to a plurality of clients by using the network device, and the network device is configured to send access requests of the plurality of clients to an access queue of the storage unit; the storage unit is configured to: execute an access request in the access queue, and return a processing result of the access request; and the network device is further configured to return the processing result that is of the access request and that is returned by the storage unit to a client corresponding to the access request.

Optionally, the network device may be a network interface controller (RNIC), a field-programmable gate array (FPGA), an application-specific integrated circuit (ASIC) chip, or the like that support remote direct memory access.

In a solution, the network device sends the access requests of the plurality of clients to the access queue for processing, and returns processing results of the access requests to corresponding clients, so that one access queue corresponds to a plurality of clients. This breaks through an inherent quantity limit of access queues, supports a large-scale networking connection, and expands scenarios.

With reference to the first aspect, in a possible implementation of the first aspect, the network device stores a correspondence between information about the plurality of clients and the access queue, and the network device is configured to send the access requests of the plurality of clients to the access queue of the storage unit based on the correspondence.

In the solution, the network device pre-stores the correspondence between the information about the clients and the access queue, and sends the access requests of the plurality of clients to the access queue based on the correspondence. In this way, the access queue can process the requests of the plurality of clients, to ensure that the storage device can support a large-scale networking connection.

With reference to the first aspect, in a possible implementation of the first aspect, the information about the plurality of clients is connection information generated when the plurality of clients each establish a connection to the network device. When receiving an access request of any one of the plurality of clients, the network device determines the access queue based on connection information corresponding to the client carried in the access request and the correspondence; and sends the connection information and the access request to the access queue. The storage unit returns the connection information when returning a processing result of the access request. The network device determines, based on the connection information, the client corresponding to the access request, and returns the processing result to the client corresponding to the access request.

In the solution, the network device sends the connection information and the access request to the access queue simultaneously, to accurately distinguish the plurality of clients, returns the connection information when the storage unit returns the processing result, and determines, based on the returned connection information, the client corresponding to the access request. Therefore, when the plurality of clients simultaneously corresponds to the access queue in a large-scale networking connection, the plurality of clients can be accurately distinguished and the processing result can be returned, to effectively expand scenarios.

With reference to the first aspect, in a possible implementation of the first aspect, the information about the plurality of clients is connection information generated when the plurality of clients each establish a connection to the network device. When receiving an access request of any one of the plurality of clients, the network device allocates a local identifier to a client identifier carried in the access request, where the local identifier uniquely identifies the client, and establish a correspondence between the client identifier, the local identifier, and connection information corresponding to the client; replaces the client identifier carried in the access request with the local identifier; and sends the access request to the access queue corresponding to the connection information. When receiving a processing result that is of the access request and that is returned by the storage unit, the network device obtains the local identifier from the processing result, determines, based on the local identifier, the connection information corresponding to the client, and returns the processing result to the client corresponding to the connection information.

It should be understood that the client identifier is defined by the client, and client identifiers defined by different clients may be the same. Therefore, the clients cannot be accurately distinguished based on the client identifiers. The local identifier is obtained by converting the client identifier of each client by the network device, and is unique. Each client corresponds to a different local identifier. Therefore, the clients can be accurately distinguished based on the local identifiers.

In the solution, the network device allocates a local identifier to the client identifier in the access request, to uniquely identify the client, and then establishes the correspondence between the client identifier, the local identifier, and the connection information corresponding to the client, to avoid a case in which the different clients cannot be distinguished because the client identifiers defined by the different clients are the same. In this way, the plurality of clients can be accurately distinguished, and after the storage unit returns the processing result, the connection information corresponding to the client is determined based on the local identifier. Therefore, when the plurality of clients simultaneously corresponds to the access queue in a large-scale networking connection, the plurality of clients can be accurately distinguished and the processing result can be returned, to effectively expand scenarios.

With reference to the first aspect, in a possible implementation of the first aspect, a remote direct memory access RDMA connection is established between each of the plurality of clients and the network device, and the connection information is a QP generated when the RDMA connection is established.

According to a second aspect, a data access method includes: A network device receives access requests sent by a plurality of clients connected to the network device, and sends the access requests to an access queue of a storage unit. The network device receives a processing result that is of an access request in an access queue and that is returned by the storage unit after the storage unit executes the access request. The network device returns the processing result that is of the access request and that is returned by the storage unit to a client corresponding to the access request.

With reference to the second aspect, in a possible implementation of the second aspect, the network device stores a correspondence between information about the plurality of clients and the access queue. The network device sends the access requests of the plurality of clients to the access queue of the storage unit based on the mapping relationship.

With reference to the second aspect, in a possible implementation of the second aspect, the information about the plurality of clients is connection information generated when the plurality of clients each establish a connection to the network device, and that the network device sends the access requests of the plurality of clients to the access queue of the storage unit includes: when an access request of any one of the plurality of clients is received, determining the access queue based on connection information corresponding to the client carried in the access request and the correspondence; and sending the connection information and the access request to the access queue. The processing result returned by the storage unit includes the connection information, and that the network device returns the processing result that is of the access request and that is returned by the storage unit to a client corresponding to the access request includes: The network device determines, based on the connection information, the client corresponding to the access request, and returns the processing result to the client corresponding to the access request.

With reference to the second aspect, in a possible implementation of the second aspect, the information about the plurality of clients is connection information generated when the plurality of clients each establish a connection to the network device, and that the network device sends the access requests of the plurality of clients to the access queue of the storage unit includes: when an access request of any one of the plurality of clients is received, allocating a local identifier to a client identifier carried in the access request, where the local identifier uniquely identifies the client, and establishing a correspondence between the client identifier, the local identifier, and connection information corresponding to the client; replacing the client identifier carried in the access request with the local identifier; and sending the access request to the access queue corresponding to the connection information. That the network device returns the processing result that is of the access request and that is returned by the storage unit to a client corresponding to the access request includes: When receiving the processing result that is of the access request and that is returned by the storage unit, the network device obtains the local identifier from the processing result, determines, based on the local identifier, the connection information corresponding to the client, and returns the processing result to the client corresponding to the connection information.

With reference to the second aspect, in a possible implementation of the second aspect, a remote direct memory access RDMA connection is established between each of the plurality of clients and the network device, and the connection information is a queue pair QP generated when the RDMA connection is established.

According to a third aspect, a network device includes: a receiving unit and a storage unit. The receiving unit is configured to receive access requests sent by a plurality of clients connected to the network device; and the sending unit is configured to send the access requests to an access queue of a storage unit. The receiving unit is further configured to receive a processing result that is of an access request in an access queue and that is returned by the storage unit after the storage unit executes the access request; and the sending unit is further configured to return the processing result that is of the access request and that is returned by the storage unit to a client corresponding to the access request.

With reference to the third aspect, in a possible implementation of the third aspect, the network device further includes the storage unit. The storage unit is configured to store a correspondence between information about the plurality of clients and the access queue. The sending unit is further configured to send the access requests of the plurality of clients to the access queue of the storage unit based on the mapping relationship.

With reference to the third aspect, in a possible implementation of the third aspect, the information about the plurality of clients is connection information generated when the plurality of clients each establish a connection to the network device. The network device further includes a processing unit. The processing unit is configured to: when receiving an access request of any one of the plurality of clients, determine the access queue based on connection information corresponding to the client carried in the access request and the correspondence. The sending unit is further configured to send the connection information and the access request to the access queue. The sending unit is further configured to: determine, based on the connection information, the client corresponding to the access request, and return the processing result to the client corresponding to the access request.

With reference to the third aspect, in a possible implementation of the third aspect, the information about the plurality of clients is connection information generated when the plurality of clients each establish a connection to the network device, and the network device further includes a processing unit. The processing unit is configured to: when receiving an access request of any one of the plurality of clients, allocate a local identifier to a client identifier carried in the access request, where the local identifier uniquely identifies the client, establish a correspondence between the client identifier, the local identifier, and connection information corresponding to the client, and replace the client identifier carried in the access request with the local identifier. The sending unit is further configured to send the access request to the access queue corresponding to the connection information. The processing unit is further configured to: when receiving the processing result that is of the access request and that is returned by the storage unit, obtain the local identifier from the processing result, and determine, based on the local identifier, the connection information corresponding to the client. The sending unit is further configured to: determine, based on the connection information, the client corresponding to the access request, and return the processing result to the client corresponding to the access request.

With reference to the third aspect, in a possible implementation of the third aspect, a remote direct memory access RDMA connection is established between each of the plurality of clients and the network device, and the connection information is a queue pair QP generated when the RDMA connection is established.

According to a fourth aspect, a computing device includes a processor and a memory. The processor and the memory are connected by using an internal bus, the memory stores instructions, and the processor invokes the instructions in the memory, to perform the data access method provided in any one of the second aspect and the implementations of the second aspect.

According to a fifth aspect, a computer storage medium stores a computer program. When the computer program is executed by a processor, the procedure of the data access method in any one of the second aspect and the implementations of the second aspect may be implemented.

According to a sixth aspect, a computer program product includes instructions. When the computer program is executed by a computer, the computer is enabled to perform the procedure of the data access method provided in any one of the second aspect or the implementations of the second aspect.

BRIEF DESCRIPTION OF THE DRAWINGS

To describe technical solutions in embodiments more clearly, the following briefly introduces accompanying drawings used in describing embodiments. It is clear that the accompanying drawings in the following description show some embodiments of the present disclosure, and a person of ordinary skill in the art may still derive other drawings from these accompanying drawings without creative efforts.

FIG. 7 is a schematic flowchart of a data reading method according to an embodiment;

DETAILED DESCRIPTION

Figure 1:
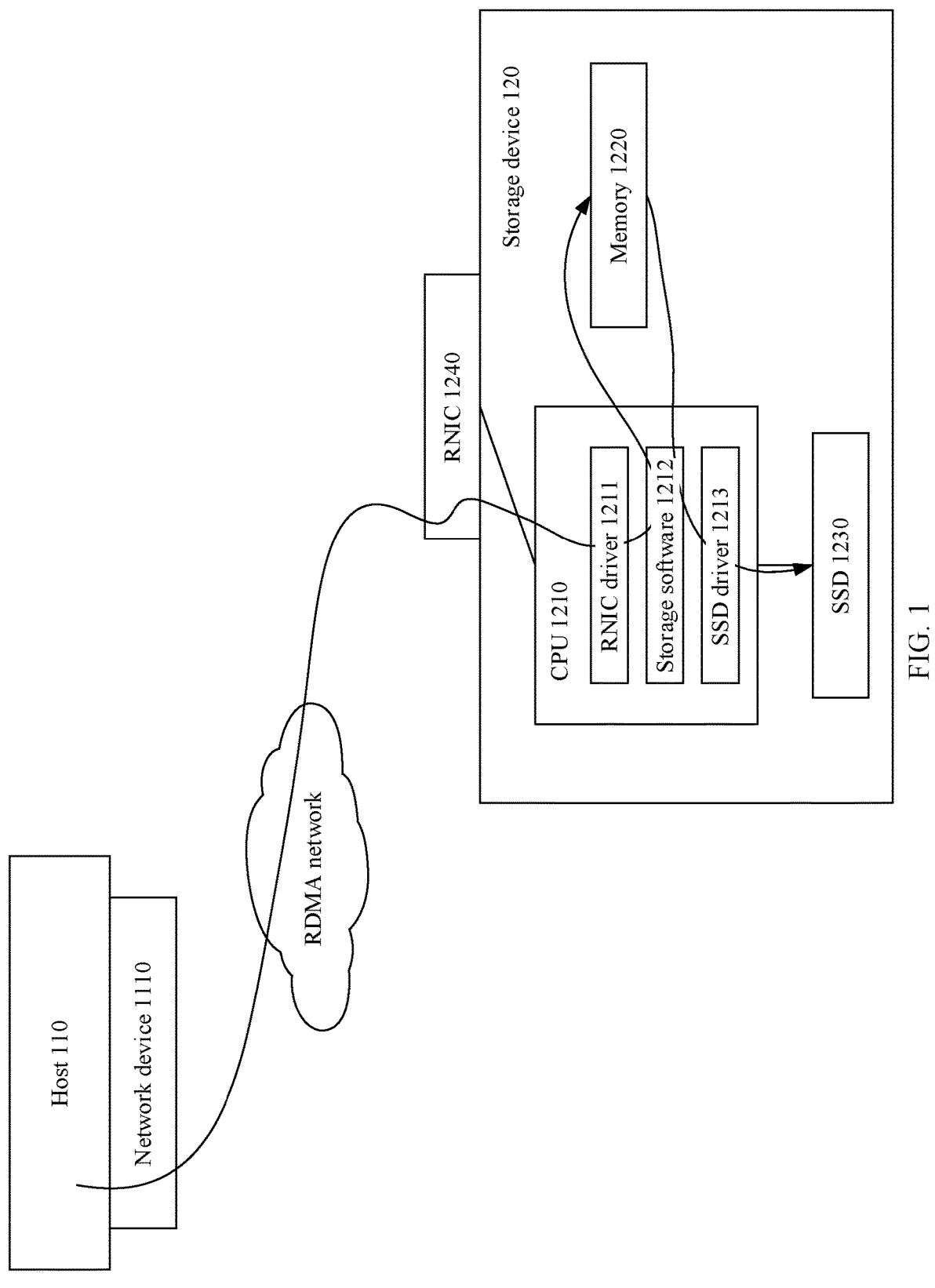
FIG. 1 is a schematic diagram of writing data into an SSD according to an embodiment.

The following clearly describes technical solutions in embodiments with reference to accompanying drawings. It is clear that the described embodiments are merely some but not all embodiments.

Some terms and related technologies are first described with reference to accompanying drawings, to help a person skilled in the art have a better understanding.

A host, also referred to as a client, may specifically include a physical machine, a virtual machine, a container, and the like. The host is configured to generate or consume data, for example, may be an application server, a distributed file system server, or the like.

A network device of the host is a device used by the host for data communication, and may specifically include a network interface controller (NIC), an RNIC, and the like.

An access request of the host mainly includes a data read/write operation, that is, the host writes generated data into a storage unit of a storage device, or reads data from the storage unit of the storage device.

The storage device, also referred to as a server, may specifically include a device that can store data and that is in a form of external centralized storage or distributed storage, for example, a storage server or a distributed database server.

A network device of the storage device is a device used by the storage device for data communication, and may specifically include a NIC, an RNIC, and the like. The storage unit of the storage device is a device used by the storage device for persistent data storage, for example, an SSD.

SQ and doorbell of the SSD: In the storage device, a CPU and the SSD of the storage device communicate according to an NVM Express (NVMe) protocol. In an initialization phase when the storage device is started, the CPU of the storage device establishes an SQ and a CQ for the SSD in a memory of the storage device according to the NVMe protocol, and creates the doorbell in the SSD. The CPU stores, in the SQ, a command sent to the SSD, writes, in the doorbell, a location of the command in the SQ, and obtains the command from the SQ for execution by using the SSD. After executing a command, the SSD stores information of the executed command in the completion queue. The CPU may determine the executed command by reading the information of the executed command in the completion queue, and delete the executed command from the send queue.

An RDMA communication protocol is a set of protocol specifications followed by a computing device configured to perform an RDMA operation. Currently, there are three RDMA-supported communication protocols: an InfiniBand (IB) protocol, an RDMA over Converged Ethernet (RoCE) protocol, and an iWARP protocol. All the three protocols may be used by using a same set of APIs, but the three protocols have different physical layers and link layers. When the host device communicates with the storage device through the RDMA, an SQ may be created in a network interface card of the host, and correspondingly, a receive queue (RQ) corresponding to the send queue may be created in a network interface card of the storage device. The send queue and the receive queue form a queue pair (QP). An address of the queue is mapped to a virtual address of an application, so that the application may directly transmit data to the network interface card of the storage device by using the QP, and then the data may be stored in the memory of the storage device.

Currently, when transmitting data through the RDMA, the host first transmits the data to the memory of the storage device, and then migrates the data from the memory to the SSD by using the CPU of the storage device. FIG. 1 is a schematic diagram of a data writing scenario. A network device 1110 of a host 110 first writes data to a network device (namely, an RNIC 1240) of a storage device 120 by performing an RDMA operation, and then the RNIC 1240 writes the data to a memory 1220 with assistance of an RNIC driver 1211 in a CPU 1210. Storage software 1212 in the storage device 120 perceives, in an event or interrupt manner, that the data is written to the memory 1220. Then, the CPU 1210 controls, by using an SSD driver 1213, an SSD 1230 to migrate the data from the memory 1220 to the SSD 1230 for persistent storage. After completing the persistent data storage, the SSD 1230 notifies the storage software 1212 in the interrupt manner. Finally, the CPU 1210 returns a write completion notification message to the host 110 through the RNIC 1240.

When data is stored persistently, participation of the CPU (including the RNIC driver, the storage software, and the SSD driver) may be required to complete an entire storage process. This consumes a large quantity of CPU resources.

Figure 2:
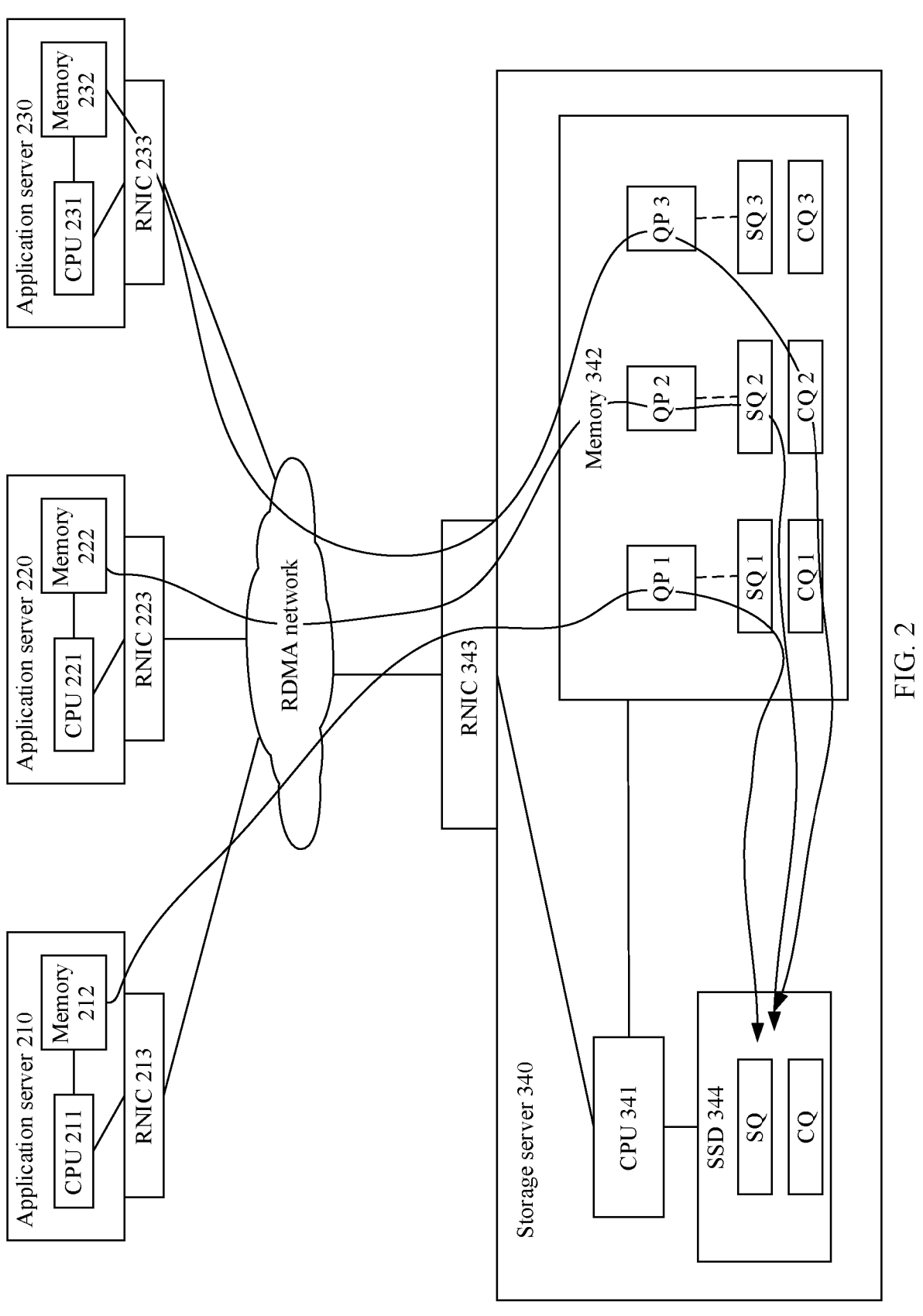
FIG. 2 is another schematic diagram of writing data into an SSD according to an embodiment.

To reduce CPU usage and reduce a processing latency, the data is directly written into the SSD, and an SQ address of the SSD and a QP between the host and the storage device may be bound one by one. FIG. 2 is a schematic diagram of another data writing scenario. An application server 210, an application server 220, and an application server 230 are connected to a storage server 240 through an RDMA network. A structure of each application server is similar. The application server 210 is used as an example. The application server 210 includes a CPU 211 and a memory 212, and is connected to an RNIC 213. The storage server 240 includes a CPU 241 and a memory 242, and is connected to an RNIC 243 and a persistent storage medium. Herein, an SSD 244 is used as an example for description. It should be understood that the persistent storage medium includes but is not limited to the SSD 244. Each application server is connected to the storage server, to form a QP. Therefore, the memory 242 of the storage server 240 has a plurality of QPs, for example, a QP 1, a QP 2, and a QP 3, and each QP corresponds to a connection between the storage server 240 and one application server. In addition, the SSD 244 includes a plurality of SQs and CQs, and a maximum quantity of SQs and a maximum quantity of CQs may be supported to 64,000. However, in consideration of memory and performance, a maximum quantity of 256 is typically selected currently. The application server 210 is used as an example, to describe a specific binding process of the SQ and the QP. The application server 210 registers the memory 212 required for data communication with the RNIC 213, and the storage server 240 registers the memory 242 required for data communication with the RNIC 243, so that the RNIC 213 and the RNIC 243 can operate the memory 242 and the memory 212 in an RDMA manner. In addition, the storage server 240 binds the SQs in the SSD 244 to the stored QPs one by one, for example, binds the QP 1 connected to the application server 210 to an SQ 1. Then, an address of the SQ 1 is mapped, and a virtual address obtained through mapping is registered with the RNIC 243. The RNIC 243 sends the address of the SQ 1 to the RNIC 213 through an RDMA connection, so that the RNIC 213 can directly remotely operate the address of the SQ 1 in the SSD 244. During data writing, the application server 210 generates data by using the CPU 211 and stores the generated data in the memory 212, then writes the data into the memory 242 of the storage server 240 through the RNIC 213, and notifies, based on the SQ address of the SSD 244, the SSD 244 to migrate the data in the memory 242 to the SSD 244 for persistent storage. If another application server needs to write data to the storage server 240, a process is similar to that in the foregoing description, and details are not described herein again.

It should be noted that, in the solution, the QPs are bound to the SQs in the SSD one by one, so that data can be directly written into the SSD without participation of the CPU and software of the storage server. But this is limited to a quantity of SQs in the SSD. When a quantity of connections is excessively large, the solution is no longer applicable, that is, a large-scale networking scenario cannot be supported.

Based on the description, a data access method is provided. When a quantity of connections to a storage device far exceeds a quantity of SQs supported by an SSD, a submission queue description structure format (SQE) of the SSD is extended or a client identifier of an application server is converted, so that the storage device can send access requests of a plurality of clients to an access queue of a storage unit. In other words, a plurality of connections of the storage device can be bound to one SQ, to support a large-scale networking connection and expand applicable scenarios.

The technical solutions in embodiments may be applied to any system that needs to remotely access a persistent storage medium, especially in a large-scale networking scenario with a large quantity of connections, for example, distributed storage and high-performance computing (HPC). For example, in the distributed storage, a storage device is connected to a large quantity of application servers simultaneously. When the storage device needs to support each application server in directly accessing an SSD, the data access method provided in embodiments may be used in a distributed storage system, so that a bandwidth bottleneck existing during data read/write can be resolved, and data read/write efficiency can be improved.

Figure 3:
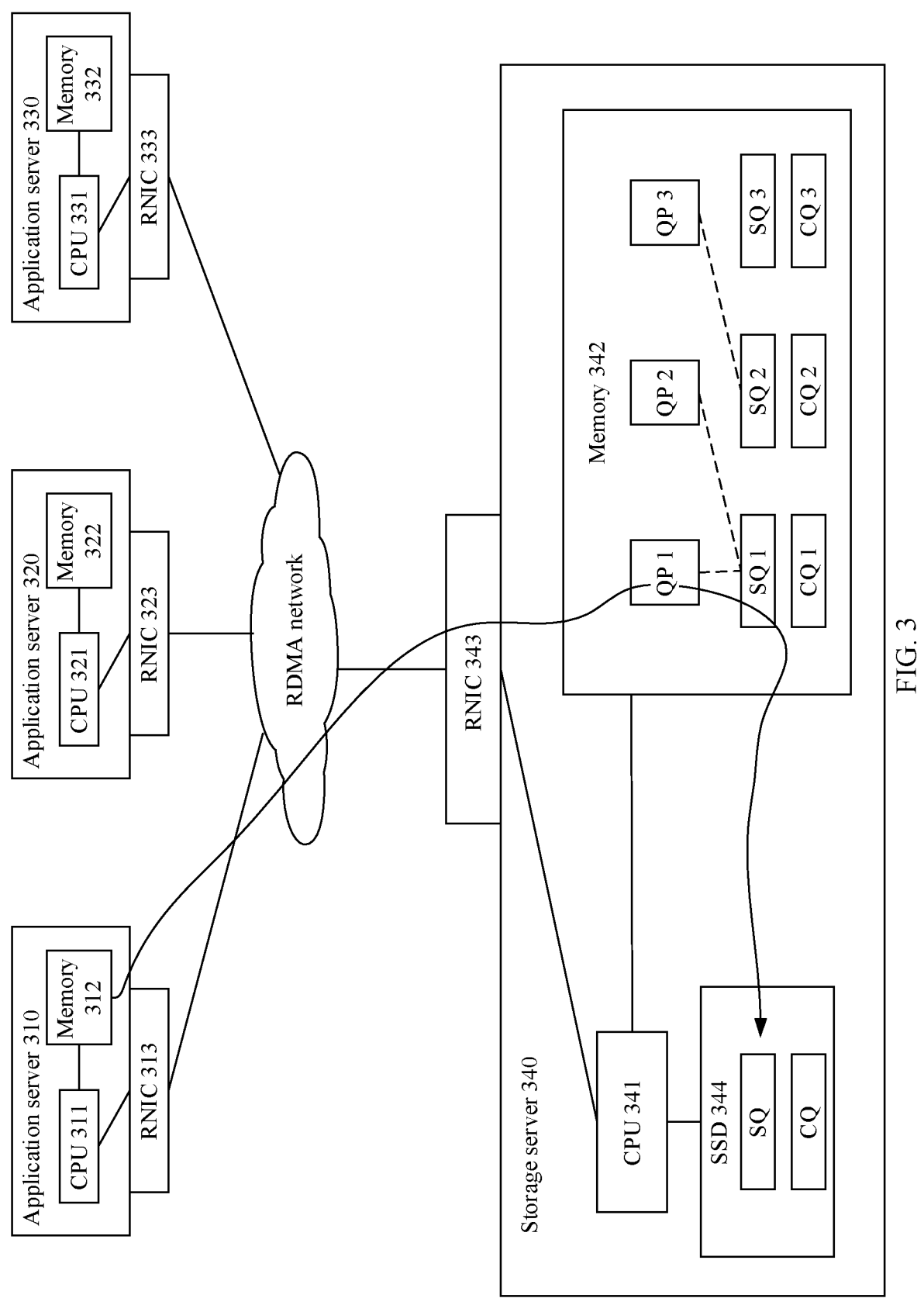
FIG. 3 is a schematic diagram of a system architecture according to an embodiment.

FIG. 3 is a schematic diagram of a system architecture according to an embodiment. As shown in FIG. 3, the system 300 includes: an application server 310, an application server 320, an application server 330, and a storage server 340. The application server 310, the application server 320, and the application server 330 are connected to the storage server 340 through an RDMA network. The application server 310 includes a CPU 311 and a memory 312, and is connected to an RNIC 213. Structures of the application server 320 and the application server 330 are similar to a structure of the application server 310. The storage server 340 includes a CPU 341 and a memory 342, and is connected to an RNIC 343 and a storage unit. Herein, an SSD 344 is used as an example for description. It should be understood that the storage unit may be but is not limited to the SSD 344. Because the application server 310, the application server 320, and the application server 330 are all connected to the storage server 340, there are three QPs in the memory 342 of the storage server 340: a QP 1, a QP 2, and a QP 3. The storage server 340 binds the QP 1 and the QP 2 to an SQ 1, and binds the QP 3 to an SQ 2. After the procedure is completed, a data read/write operation may be further performed. For example, the application server 310 writes data to the storage server 340. The application server 310 generates data by using the CPU 311, stores the generated data in the memory 312, and then writes the data and data description information into the memory 342 of the storage server 340 by using an RNIC 313. The data description information includes a start address, a data length, an operation type, and the like of the data in the memory 242. To be compatible with and match an NVMe protocol, a size of the data description information is preferably 64 bytes. After the storage server 340 receives the data written by the application server 310, the RNIC 343 determines, based on a preset binding relationship, that an SQ corresponding to the QP 1 generated when the application server 310 is connected to the storage server 340 is the SQ 1. The application server 310 fills, based on the data description information, an SQE field corresponding to the SQ 1, and stores, by using a reserved field in the SQE, a QP number (QPN), namely, a number corresponding to the QP 1. Alternatively, the storage server 340 converts a client identifier carried in the data description information into a local identifier, and stores the local identifier in the SQE, and then notifies the SSD 344 to migrate the data in the memory 342 to the SSD 344 for persistent storage. After completing storage, the SSD 344 copies QPN information to a CQE of a CQ, and the storage server 340 determines the corresponding QPN based on the CQE. Alternatively, the storage server 340 determines the corresponding client identifier and the corresponding QPN based on the local identifier in the CQE, then, finds the corresponding QP based on the QPN, and returns a data write completion message to the application server 310 by using the QP.

In this embodiment, the RNIC 313, an RNIC 323, and an RNIC 333 may be programmable RNICs. The SSD 344 is a programmable SSD, and may actively perceive and report a completion status of the SQ. The application server 310, the application server 320, the application server 330, and the storage server 340 include forms such as a physical machine, a virtual machine, and a container, and may be deployed on one or more computing devices (for example, central servers) in a cloud environment, or one or more computing devices (for example, servers) in an edge environment.

It can be learned that, compared with the data access system shown in FIG. 2, in the data access system shown in FIG. 3, the storage server may bind connections (e.g., QPs) to a plurality of application servers to a same SQ simultaneously, and send access requests of the plurality of application servers to the SQ. This breaks through an inherent quantity limit of SQs in the SSD, can support a large-scale networking connection, and expands scenarios.

Figure 4:
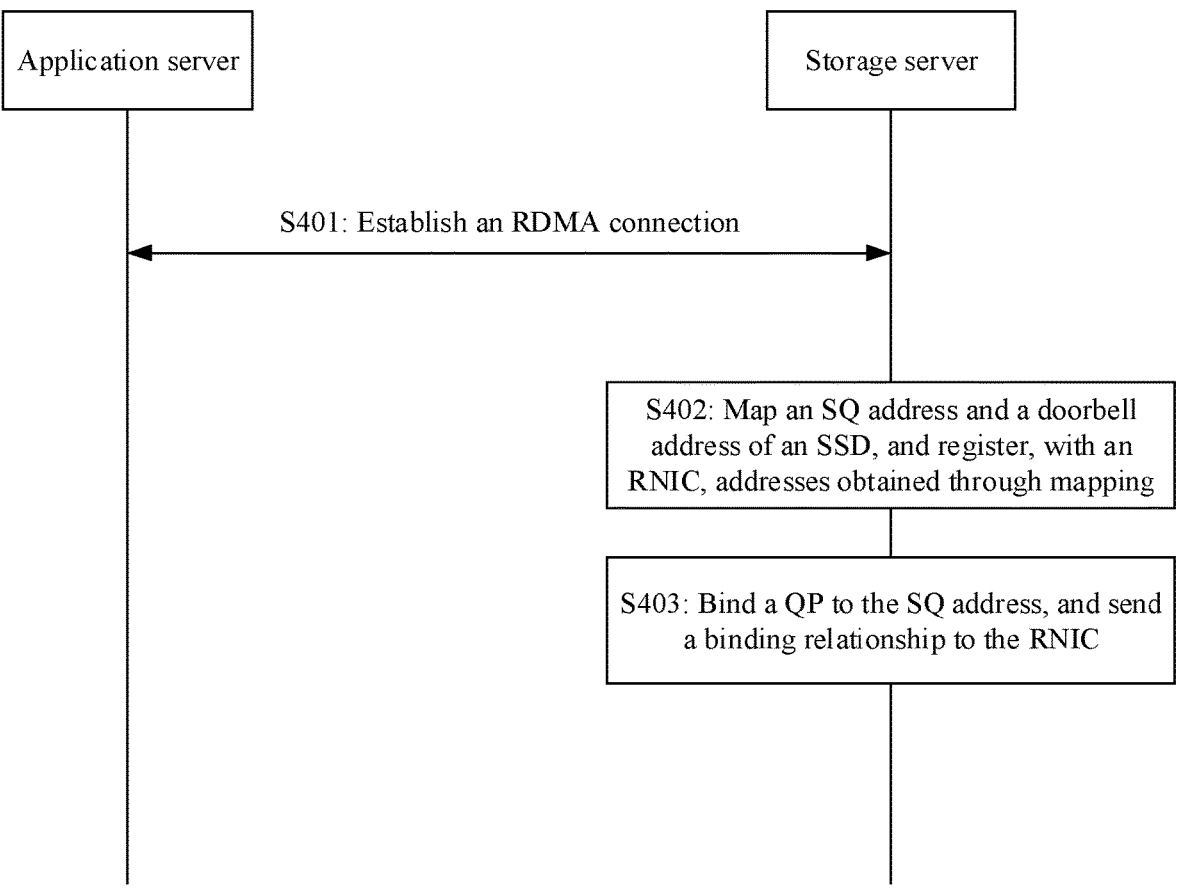
FIG. 4 is a schematic flowchart of a connection establishment method according to an embodiment.

With reference to the schematic diagram of the system architecture shown in FIG. 3, the following describes the data access method provided in embodiments with reference to FIG. 4. First, a process of connection establishment and memory registration before data access is described. An example in which the application server 310 establishes a connection to the storage server 340 is used for description. A process of connection establishment and memory registration of another application server is similar to that of the application server 310. As shown in FIG. 4, the procedure includes the following steps.

S401: The application server 310 establishes an RDMA connection to the storage server 340.

Optionally, the application server 310 may establish the RDMA connection to the storage server 340 according to any one of an IB, RoCE, or IWARP protocol.

Specifically, the application server 310 and the storage server 340 register a memory address (which may be a continuous virtual memory or continuous physical memory space) required for data communication, and provide the memory address to a network device as a virtual continuous buffer. The buffer uses a virtual address. For ease of understanding and description, in this embodiment, an example in which the network device is an RNIC is used for description, and no further differentiation is made in subsequent descriptions. For example, the application server 310 registers the memory 312 with the RNIC 313, and the storage server 340 registers the memory 342 with the RNIC 343. It should be understood that, during registration, operating systems of the application server 310 and the storage server 340 check permission of registered blocks. A registration process writes, into the RNIC, a mapping table between a virtual address and a physical address of a memory that needs to be registered. In addition, during memory registration, permissions of a corresponding memory area are set, and the permission includes local write, remote read, remote write, and the like. After the registration, the memory registration process locks a memory page. To prevent the memory page from being replaced, the registration process also needs to maintain mapping of a physical memory and a virtual memory.

Optionally, when performing memory registration, the application server 310 and the storage server 340 may perform registration on all memories of the application server 310 and the storage server 340, or perform registration on some randomly selected memories. During registration, a start address and a data length of the memory that need to be registered are provided to the RNIC, so that the RNIC can determine the memory that needs to be registered.

It should be noted that, each memory registration correspondingly generates a remote identifier (e.g., key) and a local identifier. The remote identifier is used by a remote host to access a local memory, and the local identifier is used by a local host to access the local memory. For example, during a data receiving operation, the storage server 340 provides, for the application server 310, the remote identifier generated through memory registration, so that the application server 310 can remotely access the system memory 342 of the storage server 340 during the RDMA operation. In addition, a same memory buffer may be registered for a plurality of times (even be set with different operating permissions), and a different identifier is generated for each registration.

In addition, in a process of establishing the RDMA connection, the application server and the storage server negotiate to create a QP. When the QP is created, an associated send queue SQ and an associated receive queue RQ are created. After creation is completed, the application server 310 may communicate with the storage server 340 by using the QP.

It may be understood that after the application server 310 establishes the RDMA connection to the storage server 340, the application server 310 may remotely operate the memory 342 of the storage server 340 in an RDMA manner.

S402: The storage server 340 maps an SQ address and a doorbell address of the SSD 344, and registers, with the RNIC 343, addresses obtained through mapping.

Specifically, in an initialization phase of the storage server 340, the storage server 340 establishes an SQ for the SSD 344 in the memory 342, and establishes a doorbell in the SSD 344, to implement communication between the CPU 341 in the storage server 340 and the SSD 344. It should be noted that the SQ address and the doorbell address are addresses in kernel-mode memory address space, cannot be directly registered with the RNIC 343, and can be registered only after being converted into user-mode virtual addresses.

Further, the storage server 340 maps the SQ address and the doorbell address of the SSD to logically consecutive user-mode virtual addresses, and then provides the virtual addresses obtained through mapping to the RNIC 343 of the storage server for registration. A registration process thereof is similar to the memory registration process, and details are not described herein again. Optionally, the storage server 340 may complete the mapping process in a memory mapping (MMAP) manner, to map the SQ address and the doorbell address to the user-mode virtual addresses, so as to ensure normal communication between the SSD and the RNIC 343.

S403: The storage server 340 binds the QP to the SQ of the SSD 344.

Specifically, a plurality of SQ addresses are allocated to the SSD 344 in the initialization phase. When establishing RDMA connections, the RNIC 343 of the storage server 340 and RNICs of a plurality of application servers including the application server 310 also create a plurality of QPs. Management software in the storage server 340 binds the SQ addresses to the QPs, and sends a binding relationship to the RNIC 343 for storage.

It should be noted that, for a connection between each application server and the storage server 340, the storage server 340 may accurately distinguish the application servers in a manner such as numbering. In other words, for each QP, there is a unique QPN corresponding to the QP.

Further, the storage server 340 binds N QPs to one SQ, to support a large-scale networking connection. A specific value of N may be set based on an actual requirement, for example, may be set to 100. This is not limited in this disclosure.

It can be learned that, after the storage server 340 binds the SQ addresses to the QPs, the storage server 340 may identify, based on the stored binding relationship, a QP corresponding to each SQ address, to distinguish different clients or application servers.

It may be understood that, the method procedure shown in FIG. 4 is performed, so that the application server 310 and the storage server 340 may successfully establish the RDMA connection and perform data transmission, the application server 310 may remotely operate the memory 342 of the storage server 340, and the storage server 340 may persistently store, based on the binding relationship between the QP and the SQ, the data written by the application server 310.

Figure 5:
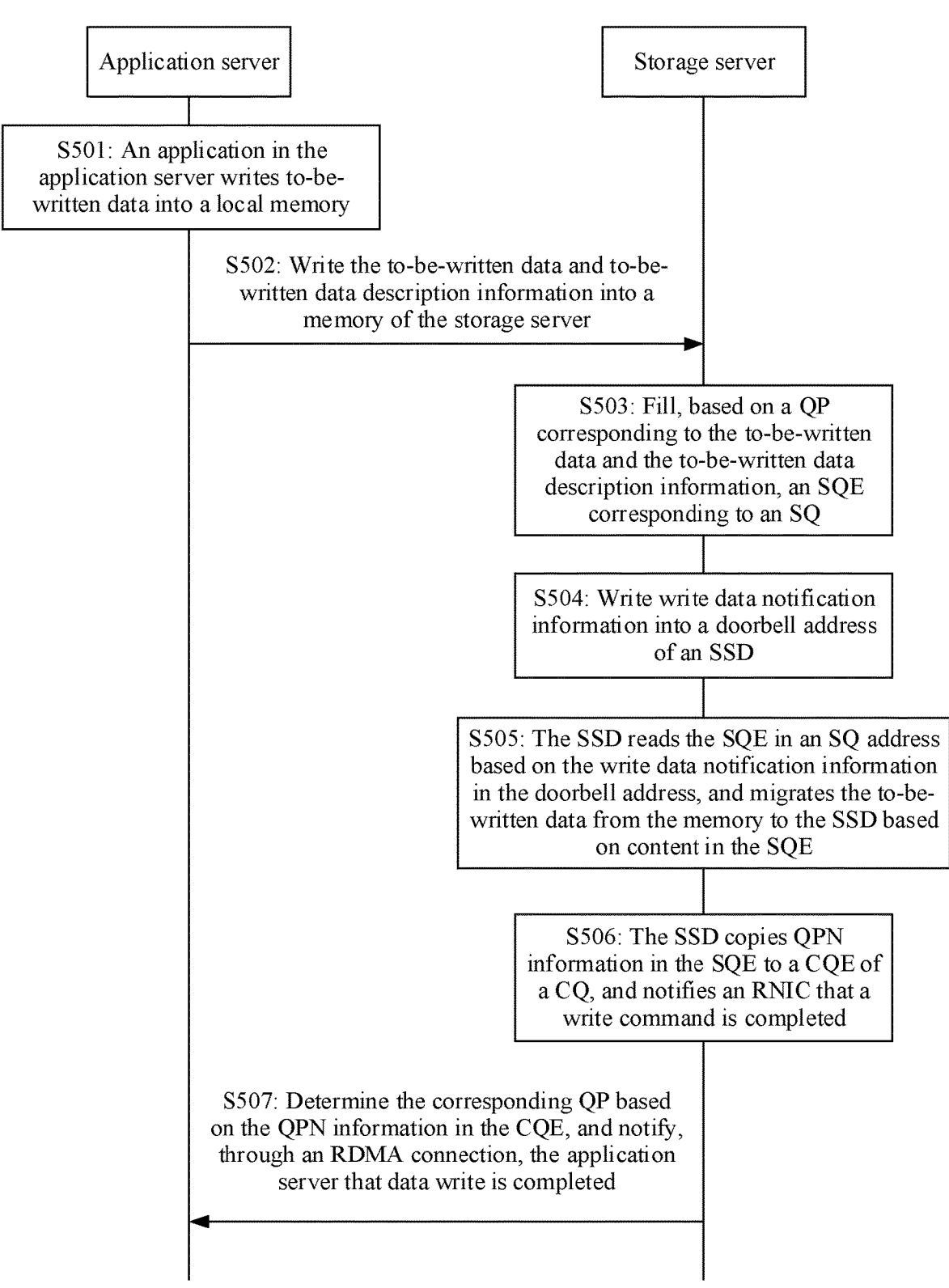
FIG. 5 is a schematic flowchart of a data writing method according to an embodiment.

With reference to the system architecture shown in FIG. 3 and the connection establishment method procedure shown in FIG. 4, the following describes a data write procedure in detail. An example in which the application server 310 writes data to the storage server 340 is used. As shown in FIG. 5, the procedure includes the following steps.

S501: An application in the application server 310 writes to-be-written data into a local memory.

Specifically, the application in the application server 310 generates the data that needs to be written into the SSD 344 of the storage server 340, and then first stores the data in the memory 312 of the application server 310.

S502: The RNIC 313 of the application server 310 writes the to-be-written data and to-be-written data description information into the memory 342 of the storage server 340.

Specifically, the application in the application server 310 sends an RDMA request to the RNIC 313 of the application server 310, and the request includes an address (for example, including a start address and a data length) of the to-be-written data in the memory 312. Then, the RNIC 313 extracts the to-be-written data from the memory 312 of the application server 310 based on the request, and encapsulates, into a dedicated packet, the address (including the start address and the data length) of the to-be-written data in the storage server 340 and a remote identifier that is used to operate the memory corresponding to the address and that is sent by the storage server 340. In addition, the to-be-written data description information is also encapsulated into the dedicated packet, where the to-be-written data description information includes the start address and the data length of the to-be-written data in the storage server 340, a data operation type (namely, a data write operation), and the like. Then, the dedicated packet is sent to the RNIC 343 of storage server 340 by using the QP. After receiving the dedicated packet, the RNIC 343 of the storage server 340 determines, based on the remote identifier in the packet, whether the application server 310 has a permission to operate the memory 342 of the storage server 340, and after determining that the application server 310 has the permission, writes the to-be-written data into the memory corresponding to the address in the packet, and also writes the to-be-written data description information into the memory 342.

S503: The RNIC 343 of the storage server 340 fills, based on the QP corresponding to the to-be-written data and the to-be-written data description information, an SQE corresponding to the SQ.

Figure 6:
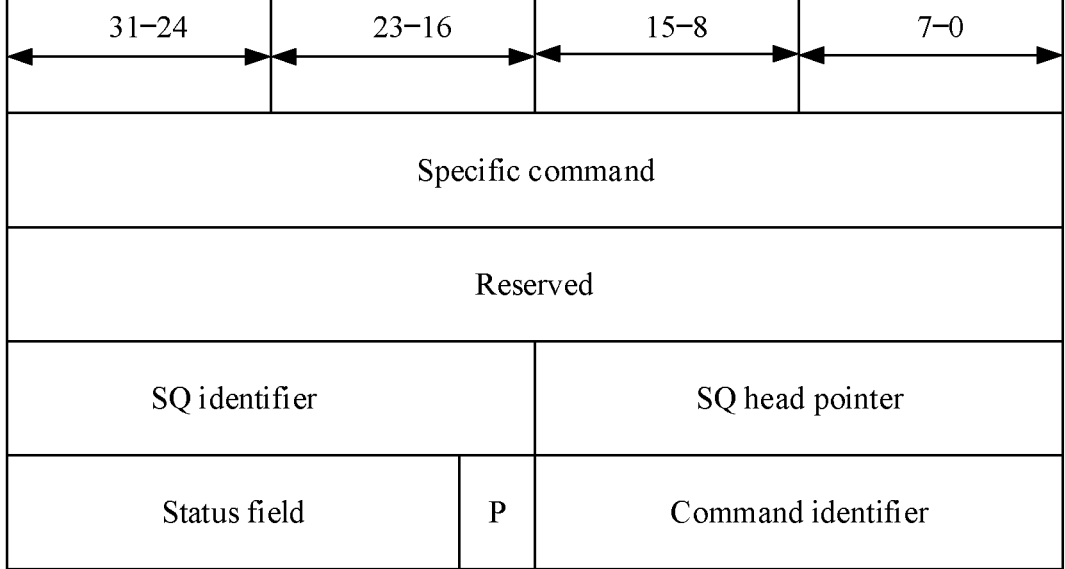
FIG. 6 is a schematic diagram of a submission queue description structure format according to an embodiment.

Specifically, after the application server 310 writes the to-be-written data and the to-be-written data description information into the memory 342 of the storage server 340 by using the QP, the RNIC 343 of the storage server 340 may determine, based on the pre-stored binding relationship, an SQ corresponding to the QP. Each SQ includes one or more SQEs. A format of each SQE complies with a specification of the NVMe protocol, and a size of each SQE is 64 bytes. FIG. 6 is a schematic diagram of an SQE format. The SQE includes a specific command field, a reserved field, an SQ identifier field, an SQ head pointer field, a status field, a command identifier field, and the like. The RNIC 343 of the storage server 340 fills, based on the to-be-written data description information, the SQE corresponding to the SQ.

It should be noted that, when filling the SQE, the RNIC 343 of the storage server 340 extends the reserved field in the SQE, and stores, by using the reserved field, a QPN corresponding to the QP, so that the SQE carries QPN information.

S504: The RNIC 343 of the storage server 340 writes write data notification information into the doorbell address of the SSD 344.

Specifically, the RNIC 343 of the storage server 340 writes the write data notification information into the doorbell address of the SSD 344, where the write data notification information includes an SQ address into which the SQE is written, and the write data notification information notifies the SSD 344 to read the SQE in the SQ address.

S505: The SSD 344 reads the SQE in the SQ address based on the write data notification information in the doorbell address, and migrates the to-be-written data from the memory 342 of the storage server 340 to the SSD 344 based on content in the SQE.

Specifically, after receiving the write data notification information written into the doorbell address, the SSD 344 is woken up, then reads the SQE in the SQ address included in the write data notification information, and determines that the operation is a data write operation. Then, the to-be-written data is found from the memory 342 of the storage server 340 based on the address carried in the SQE, and the to-be-written data is migrated to the SSD 344, to complete persistent storage.

It can be learned that the to-be-written data may be migrated from the memory 342 of the storage server 340 to the SSD 344 without participation of any software or CPU. This process is directly completed by the SSD 344. This reduces CPU usage of the storage server 340 and effectively reduces costs.

S506: After completing persistent data storage, the SSD 344 copies the QPN information in the SQE to the CQE of the CQ, and notifies the RNIC 343 that a write command is completed.

Specifically, in the NVMe, each SQ corresponds to one CQ, each CQ includes one or more CQEs, and a size of each CQE is also 64 bytes. A format of each CQE is similar to the format of the SQE shown in FIG. 6. After completing persistent data storage, the SSD 344 copies a QPN field in the SQE to a reserved field in the CQE, and then notifies the RNIC 343 that the write command is completed.

S507: The RNIC 343 of the storage server 340 determines, based on the QPN information in the CQE, a QP corresponding to the QPN information, and notifies, by using the QP, the application server 310 that data write is completed.

Specifically, after receiving a write command completion notification sent by the SSD 344, the RNIC 343 reads the CQE from the CQ, to obtain the QPN information, determines, based on the QPN information, the QP corresponding to the QPN information, and then notifies, by using the QP, the application server 310 that the data write is completed, to complete an entire data write procedure.

It can be learned that, in the process of writing the to-be-written data into the SSD 344, when there is the plurality of QPs, the plurality of QPs are bound to the one SQ, and the QPN is stored by using the reserved field in the SQE. After the data write is completed, the corresponding QP may be accurately found by using the QPN in the CQE, to reply with a completion message. This may effectively support a large-scale networking connection, and expands applicable scenarios.

The method procedure described in FIG. 5 describes in detail the process of writing data from the application server to the SSD. Correspondingly, the application server may further read data from the SSD. The following describes a data read procedure in detail. As shown in FIG. 7, the procedure includes the following steps.

S701: The RNIC 313 of the application server 310 writes to-be-read data description information into the memory 342 of the storage server 340.

Specifically, an application in the application server 310 generates a data read request, and then sends the data read request to the RNIC 313 of the application server 310, and the read request includes an address (including a start address and a data length) of to-be-read data in the SSD 344 and an address of the data stored in the memory 342 of the storage server 340 after the data is read from the SSD 344.

Further, the RNIC 313 of the application server 310 operates the memory 342 of the storage server 340 by using the stored remote identifier, and writes the to-be-read data description information into the memory 342 of the storage server 340. The to-be-read data description information includes the start address and the address length of the to-be-read data in the SSD 344, an address in which the to-be-read data needs to be stored in the memory 342 of the storage server 340, and a data operation type (namely, a data read operation). The RNIC 343 fills, based on a QP corresponding to the to-be-written data and the to-be-written data description information, an SQE corresponding to the SQ.

S702: The RNIC 343 of the storage server 340 fills, based on the QP corresponding to the to-be-read data and the to-be-read data description information, the SQE corresponding to the SQ.

Specifically, after the application server 310 writes the to-be-read data description information into the memory 342 of the storage server 340 by using the QP, the RNIC 343 of the storage server 340 may determine, based on the pre-stored binding relationship, the SQ corresponding to the QP, and the RNIC 343 of the storage server 340 fills, based on the to-be-read data description information, the SQE corresponding to the SQ.

Similarly, when filling the SQE, the RNIC 343 of the storage server 340 extends a reserved field in the SQE, and stores, by using the reserved field, a QPN corresponding to the QP, so that the SQE carries QPN information.

S703: The RNIC 343 of the storage server 340 writes read data notification information into the doorbell address of the SSD 344.

Specifically, the RNIC 343 of the storage server 340 writes the read data notification information into the doorbell address of the SSD 344, where the read data notification information includes an SQ address into which the SQE is written, and the read data notification information notifies the SSD 344 to read the SQE in the SQ address.

S704: The SSD 344 reads the SQE in the SQ address based on the read data notification information in the doorbell address, and migrates the to-be-read data from the SSD 344 to the memory 342 of the storage server 340 based on content in the SQE.

Specifically, after receiving the read data notification information written into the doorbell address, the SSD 344 is woken up, then reads the SQE in the SQ address included in the read data notification information, and determines that the operation is a data read operation. Then, the data is extracted from the SSD 344 based on the address carried in the SQE, and the data is migrated to the memory 342 of the storage server 340.

S705: After completing data migration, the SSD 344 copies the QPN information in the SQE to the CQE of the CQ, and notifies the RNIC 343 that a read command is completed.

Specifically, after migrating the data to the memory 342 of the storage server 340, the SSD 344 copies a QPN field in the SQE to the reserved field in the CQE, and then notifies the RNIC 343 that the read command is completed.

S706: The RNIC 343 of the storage server 340 determines, based on the QPN information in the CQE, the QP corresponding to the QPN information, writes the to-be-read data into the memory 312 of the application server 310 by using the QP, and notifies the application server 310 that data read is completed.

Specifically, after receiving a read command completion notification sent by the SSD 344, the RNIC 343 reads the CQE from the CQ, to obtain the QPN information, determines, based on the QPN information, the QP corresponding to the QPN, writes the to-be-read data into the memory 312 of the application server 310 by using the QP, and then notifies the application server 310 that the data read is completed, to complete an entire data read procedure.

It should be noted that the method embodiment shown in FIG. 7 and the method embodiment shown in FIG. 5 are based on a same idea, and may be mutually referenced in a specific implementation process. For brevity, details are not described herein again.

Figure 8:
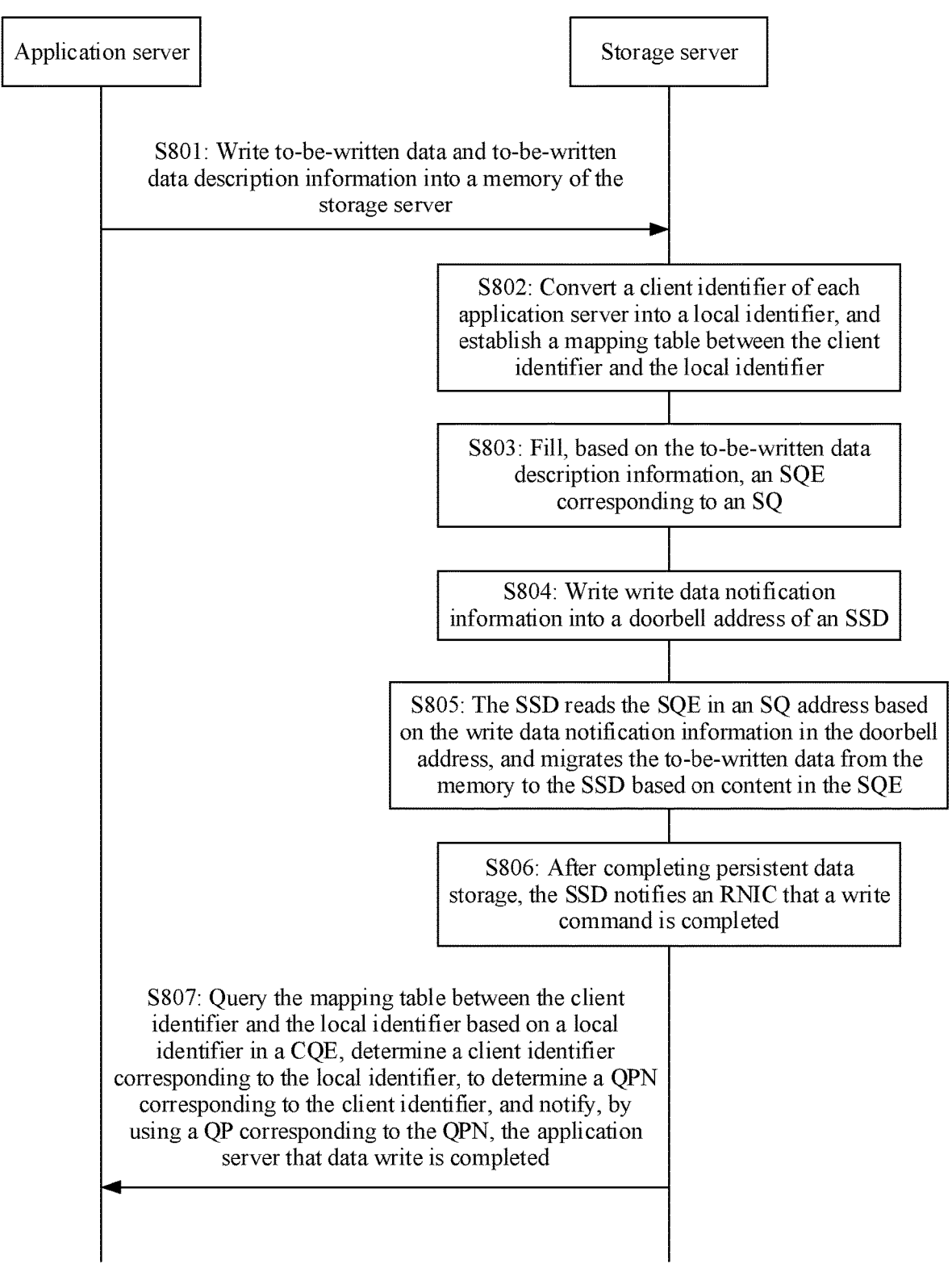
FIG. 8 is a schematic flowchart of another data writing method according to an embodiment.

With reference to the system architecture shown in FIG. 3 and the connection establishment method procedure shown in FIG. 4, the following describes in detail another data writing method. As shown in FIG. 8, the procedure includes the following steps.

S801: The storage server 340 receives to-be-written data and to-be-written data description information written by an application server into the memory 342.

Specifically, each application server connected to the storage server 340 writes, by using the QP of each application server through the RNIC, the data and the data description information generated by an application and into the memory 342 of the storage server 340. For example, the application server 310 writes the to-be-written data and the to-be-written data description information into the memory 342 of the storage server 340 by using the QP 1, and the application server 320 writes the to-be-written data and the to-be-written data description information into the memory 342 of the storage server 340 by using the QP 2. The to-be-written data description information includes a start address and a data length of the to-be-written data in the storage server 340, a data operation type (that is, a data write operation), and the like.

It should be noted that the to-be-written data description information further carries a client identifier cid). The client identifier is defined by each application server. Therefore, client identifiers defined by different application servers may be the same. For example, a client identifier defined by the application server 310 is a cid1, and a client identifier defined by the application server 320 is also the cid1.

It should be understood that, for each application server, there is a correspondence between a connection (e.g., QP) between the application server and the storage server 340 and a client identifier defined by the application server, that is, a QPN corresponding to the application server may be determined based on the client identifier.

S802: The RNIC 343 of the storage server 340 converts a client identifier of each application server into a local identifier, and establishes a mapping table between the client identifier and the local identifier.

Specifically, because the client identifier is defined by the application server, the client identifiers defined by different application servers may be the same. Therefore, different application servers cannot be accurately distinguished based on the client identifiers. Therefore, the RNIC 343 of the storage server 340 needs to convert the client identifier of each application server into a local unique identifier, so that different application servers can be accurately distinguished.

For example, the client identifier carried in the to-be-written data description information written by the application server 310 into the memory 342 is 00000001, the client identifier carried in the to-be-written data description information written by the application server 320 into the memory 342 is also 00000001, the client identifier carried in the to-be-written data description information written by the application server 310 into the memory 342 is 00000101, and the RNIC 343 performs conversion on the received client identifiers corresponding to the application servers and converts the received client identifiers corresponding to the application servers into local unique identifiers. For example, the RNIC 343 converts the client identifier corresponding to the application server 310 into 00000001, converts the client identifier corresponding to the application server 320 into 00000010, and converts a client identifier corresponding to the application server 330 into 00000011. It may be understood that after the conversion, an identity corresponding to each application server is unique, and different application servers may be accurately distinguished by using converted local identifiers.

In addition, after completing the identifier conversion, the RNIC 343 further establishes the mapping table between the client identifier and the local identifier. Optionally, the RNIC 343 may record a mapping relationship between the client identifier and the local identifier by using a Hash table. In the Hash table, a keyword (e.g., key) of the application server is the local identifier, and a value of the application server is the client identifier and the corresponding QPN. The RNIC 343 may query the client identifier of each application server and the corresponding local identifier by using the Hash table.

S803: The RNIC 343 of the storage server 340 fills, based on the to-be-written data description information, the SQE corresponding to the SQ.

Specifically, after the storage server 340 receives that each application server writes, based on the respective QP through the RNIC, the data and the data description information generated by the application and into the memory 342 of the storage server 340, the RNIC 343 may determine, based on the pre-stored binding relationship, an SQ corresponding to each QP, and then fill, based on the to-be-written data description information, the SQE corresponding to the SQ. It should be noted that, in a process of filling the SQE, the RNIC 343 changes an identifier field in the SQE, and fills the local identifier corresponding to the application server in the field. For example, for the application server 320, the RNIC 343 fills 00000010 in the field instead of 00000001.

S804: The RNIC 343 of the storage server 340 writes write data notification information into the doorbell address of the SSD 344.

Specifically, the RNIC 343 writes the write data notification information into the doorbell address of the SSD 344, where the write data notification information includes an SQ address into which the SQE is written, and the write data notification information notifies the SSD 344 to read the SQE in the SQ address.

S805: The SSD 344 reads the SQE in the SQ address based on the write data notification information in the doorbell address, and migrates the to-be-written data from the memory 342 of the storage server 340 to the SSD 344 based on content in the SQE.

Specifically, after receiving the write data notification information written into the doorbell address, the SSD 344 is woken up, then reads the SQE in the SQ address included in the write data notification information, and determines that the operation is a data write operation. Then, the to-be-written data is found from the memory 342 of the storage server 340 based on the address carried in the SQE, and the to-be-written data is migrated to the SSD 344, to complete persistent storage.

S806: After completing the persistent data storage, the SSD 344 notifies the RNIC 343 that a write command is completed.

Specifically, after completing the persistent data storage, the SSD 344 fills the CQE in the CQ corresponding to the SQ. A format of the CQE is consistent with a format of the SQE, and the CQE also includes an identifier field. The field stores the local identifier corresponding to the application server, and then notifies the RNIC 343 that the write command is completed.

S807: The RNIC 343 of the storage server 340 queries the mapping table between the client identifier and the local identifier based on the local identifier in the CQE, determines a client identifier corresponding to the local identifier, to determine a QPN corresponding to the client identifier, and notifies, by using the QP corresponding to the QPN, the application server that data write is completed.

Specifically, after receiving a write command completion notification sent by the SSD 344, the RNIC 343 reads the CQE from the CQ, to obtain the local identifier, queries the mapping table between the client identifier and the local identifier based on the local identifier, to obtain the client identifier and the QPN corresponding to the local identifier, then determines the corresponding QP based on the QPN, and finally notifies the application server by using the QP that the data write is completed, to complete an entire data write procedure.

It can be learned that in a process of writing the to-be-written data into the SSD 334, when there is the plurality of application servers (e.g., the plurality of QPs), and the client identifiers defined by the application servers may be the same, the plurality of QPs are bound to one SQ, the client identifiers corresponding to the QPs are converted into local unique identifiers. The converted local identifier is stored in the identifier field in the SQE. After the data write is completed, based on the local identifier in the CQE, the corresponding client identifier and QP may be accurately found by querying the mapping table between the client identifier and the local identifier, and different application servers are accurately distinguished, to return the completion message to the application server. This may effectively support a large-scale networking connection, and expand scenarios.

Figure 9:
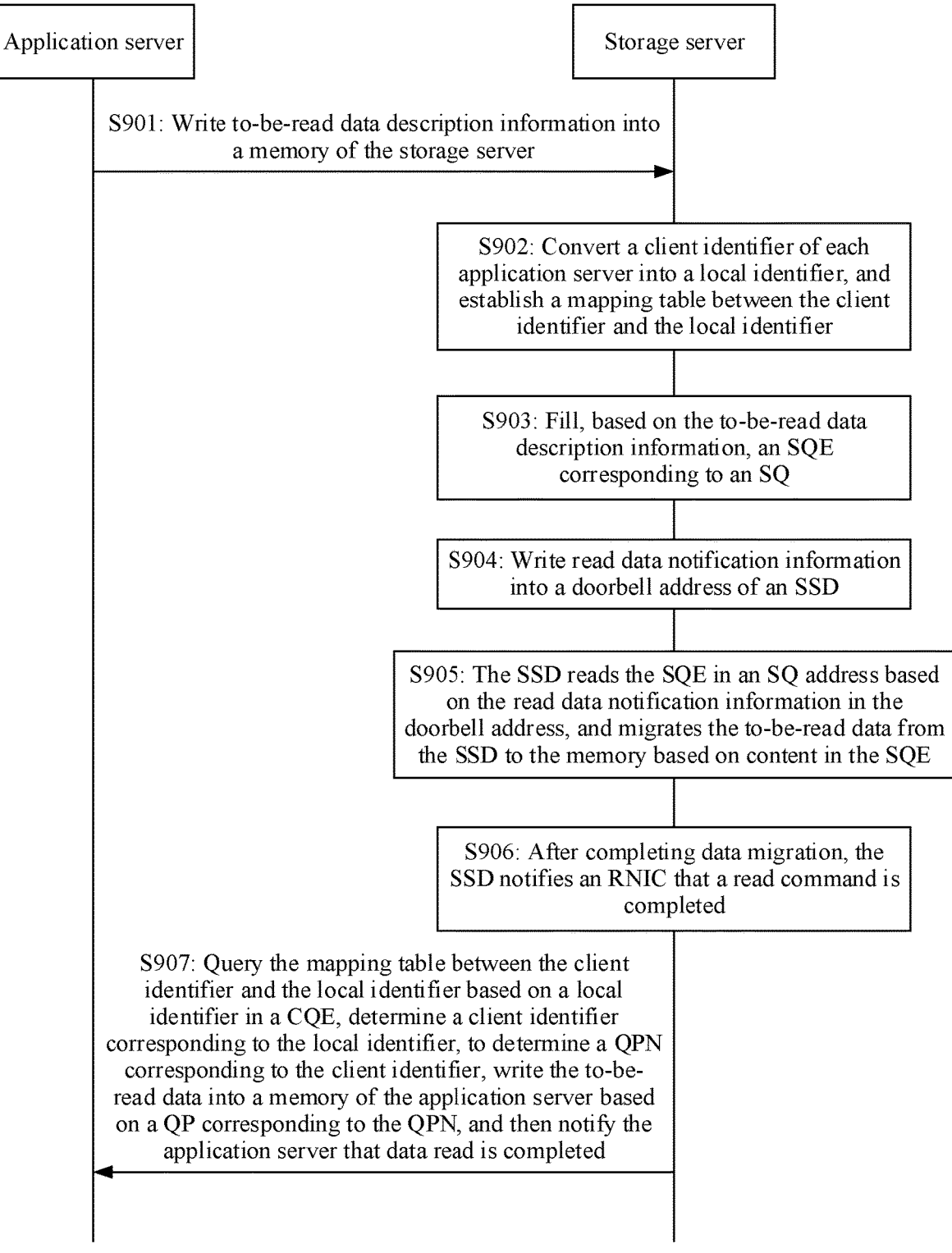
FIG. 9 is a schematic flowchart of another data reading method according to an embodiment.

The method procedure described in FIG. 8 describes in detail the process of writing data from the application server to the SSD. Correspondingly, the application server may further read data from the SSD. The following describes a data read procedure in detail. As shown in FIG. 9, the procedure includes the following steps.

S901: The storage server 340 receives to-be-read data description information written by the application server into the memory 342.

Specifically, the application server writes the to-be-read data description information into the memory 342 of the storage server 340 through the RNIC by using the QP of the application server. The to-be-read data description information includes a start address and a data length of the to-be-read data in the SSD 344, a data operation type (e.g., a data read operation), and the like. In addition, the to-be-read data description information further carries a client identifier. For a specific process, refer to related descriptions in S801, and details are not described herein again.

S902: The RNIC 343 of the storage server 340 converts the client identifier of each application server into the local identifier, and establishes the mapping table between the client identifier and the local identifier.

Specifically, after converting the client identifier of each application server into the local unique identifier, the RNIC 343 may record the mapping relationship between the client identifier and the local identifier by using the hash table. For a specific process, refer to the related descriptions in S802.

S903: The RNIC 343 of the storage server 340 fills, based on the to-be-read data description information, the SQE corresponding to the SQ.

Specifically, the RNIC 343 determines, based on the pre-stored binding relationship, an SQ corresponding to each QP, fills, based on the to-be-read data description information, the SQE corresponding to the SQ, and fills the converted local identifier of the application server in the identifier field in the SQE. For a specific process, refer to related descriptions in S803.

S904: The RNIC 343 of the storage server 340 writes read data notification information into the doorbell address of the SSD 344.

Specifically, the RNIC 343 writes the read data notification information into the doorbell address of the SSD 344, where the read data notification information includes an SQ address into which the SQE is written, and the read data notification information notifies the SSD 344 to read the SQE in the SQ address.

S905: The SSD 344 reads the SQE in the SQ address based on the read data notification information in the doorbell address, and migrates the to-be-read data from the SSD 344 to the memory 342 of the storage server 340 based on the content in the SQE.

Specifically, after receiving the read data notification information written into the doorbell address, the SSD 344 is woken up, then reads the SQE in the SQ address included in the read data notification information, and determines that the operation is a data read operation. Then, the to-be-read data is found from the SSD 344 based on the address carried in the SQE, and the to-be-read data is migrated to the memory 342 of the storage server 340.

S906: After completing data migration, the SSD 344 notifies the RNIC 343 that a read command is completed.

Specifically, after completing the data migration, the SSD 344 fills the CQE in the CQ corresponding to the SQ. The format of the CQE is consistent with the format of the SQE, and the CQE also includes the identifier field. The field stores the local identifier corresponding to the application server, and then notifies the RNIC 343 that the read command is completed.

S907: The RNIC 343 of the storage server 340 queries the mapping table between the client identifier and the local identifier based on the local identifier in the CQE, determines a client identifier corresponding to the local identifier, to determine a QPN corresponding to the client identifier, writes the to-be-read data into the memory of the application server by using the QP corresponding to the QPN, and then notifies the application server that data read is completed.

Specifically, after receiving a read command completion notification sent by the SSD 344, the RNIC 343 reads the CQE from the CQ, to obtain the local identifier, queries the mapping table between the client identifier and the local identifier based on the local identifier, to obtain the client identifier and the QPN corresponding to the local identifier, then determines the corresponding QP based on the QPN, finally writes the to-be-read data into the memory of the application server by using the QP, and notifies the application server that the data read is completed, to complete an entire data read procedure.

It should be noted that the method embodiment shown in FIG. 9 and the method embodiment shown in FIG. 5 are based on a same idea, and may be mutually referenced in a specific implementation process. For brevity, details are not described herein again.

The methods in embodiments are described in detail above. For ease of better implementing the solutions in embodiments, correspondingly related devices used to cooperate in implementing the solutions are further provided below.

Figure 10:
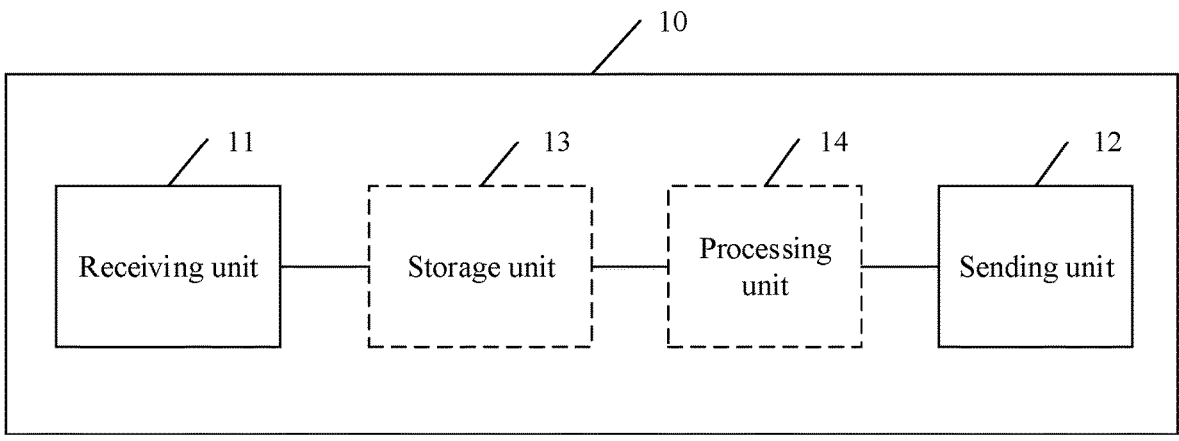
FIG. 10 is a schematic diagram of a structure of a network device according to an embodiment.

FIG. 10 is a schematic diagram of a structure of a network device according to an embodiment. As shown in FIG. 10, the network device 10 includes a receiving unit 11 and a sending unit 12.

The receiving unit 11 is configured to receive access requests sent by a plurality of clients connected to the network device 10.

The sending unit 12 is configured to send the access requests to an access queue of a storage unit.

The receiving unit 11 is further configured to receive a processing result that is of an access request of each of the plurality of clients in the access queue and that is returned by the storage unit after the storage unit executes the access request.

The sending unit 12 is further configured to return the processing result that is of the access request and that is returned by the storage unit to a client corresponding to the access request.

In an embodiment, the network device 10 further includes a storage unit 13. The storage unit 13 is configured to store a correspondence between information about the plurality of clients and the access queue. The sending unit 12 is further configured to send the access requests of the plurality of clients to the access queue of the storage unit based on the mapping relationship.

In an embodiment, the access request includes data description information, and the network device 10 further includes a processing unit 14. The processing unit 14 is configured to fill the data description information into an SQE corresponding to the access queue, and store each piece of QPN information corresponding to the plurality of clients into a reserved field of the SQE.

In an embodiment, the processing unit 14 is further configured to determine, based on QPN information in a CQE corresponding to a completion queue corresponding to the access queue, a client corresponding to a processing result that is of the access request and that is returned by the storage unit, where the QPN information in the CQE is obtained by copying the QPN information in the SQE after the storage unit executes the access request in the access queue. The sending unit 12 is further configured to return, based on a QP corresponding to the QPN information, the processing result to the client corresponding to the access request.

In an embodiment, the access request includes the data description information, and the data description information carries a client identifier. The processing unit 14 is further configured to convert the client identifier into a local identifier, and establish a mapping table between the client identifier and the local identifier, and the local identifier is used to uniquely identify the plurality of clients.

In an embodiment, the processing unit 14 is further configured to: fill the data description information into the SQE corresponding to the access queue, where the SQE includes the local identifier; and query, based on a local identifier in the CQE corresponding to the completion queue corresponding to the access queue, the mapping table between the client identifier and the local identifier, to determine a client identifier corresponding to the local identifier and the client corresponding to the processing result that is of the access request and that is returned by the storage unit. The sending unit 12 is further configured to return, based on a QP corresponding to the client identifier, the processing result to the client corresponding to the access request.

It should be understood that the structure of the network device is merely an example, and should not constitute a specific limitation. Units of the network device may be added, deleted, or combined as required. In addition, operations and/or functions of units in the network device are respectively used to implement corresponding procedures of the methods described in FIG. 4, FIG. 5, FIG. 7, FIG. 8, and FIG. 9. For brevity, details are not described herein again.

Figure 11:
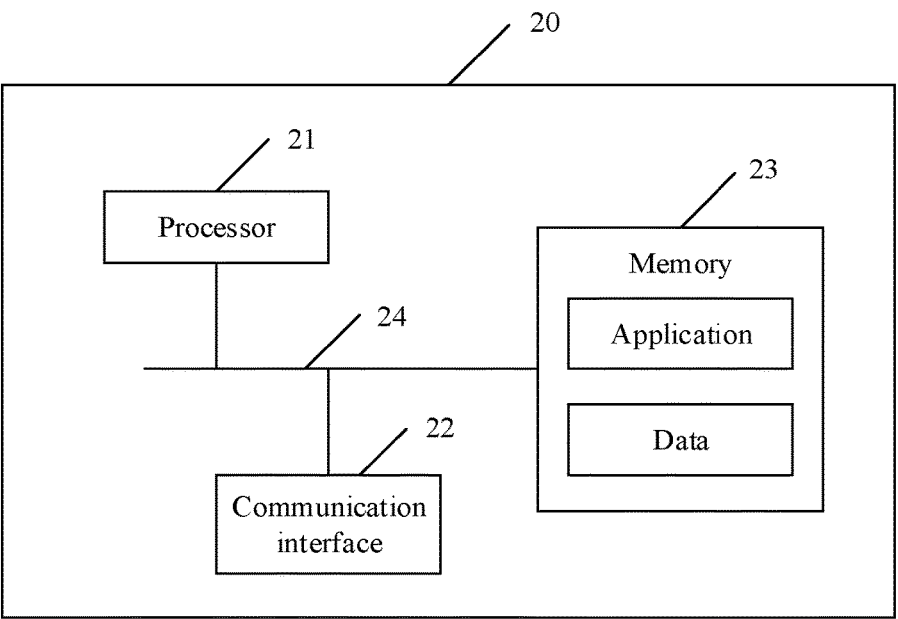
FIG. 11 is a schematic diagram of a structure of a computing device according to an embodiment.

FIG. 11 is a schematic diagram of a structure of a computing device according to an embodiment. As shown in FIG. 11, the computing device 20 includes a processor 21, a communication interface 22, and a memory 23. The processor 21, the communication interface 22, and the memory 23 are connected to each other by using an internal bus 24.

The computing device 20 may be the network device in FIG. 3. The function performed by the network device in FIG. 3 is actually performed by the processor 21 of the network device.

The processor 21 may include one or more general-purpose processors, for example, a CPU, or a combination of a CPU and a hardware chip. The hardware chip may be an ASIC, a programmable logic device (PLD), or a combination thereof. The PLD may be a complex programmable logic device (CPLD), an FPGA, generic array logic (GAL), or any combination thereof.

The bus 24 may be a Peripheral Component Interconnect (PCI) bus, an Extended Industry Standard Architecture (EISA) bus, or the like. The bus 24 may be classified into an address bus, a data bus, a control bus, and the like. For ease of representation, only one bold line represents the bus in FIG. 11, but this does not mean that there is only one bus or only one type of bus.

The memory 23 may include a volatile memory, for example, a random-access memory (RAM). The memory 23 may alternatively include a non-volatile memory, for example, a read-only memory (ROM), a flash memory, a hard disk drive (HDD), or an SSD. The memory 23 may alternatively include a combination of the foregoing types of memories. Program code may be used to implement function units shown in the network device 10, or used to implement method steps performed by the network device in method embodiments shown in FIG. 4, FIG. 5, FIG. 7, FIG. 8, and FIG. 9.

An embodiment further provides a computer-readable storage medium. The computer-readable storage medium stores a computer program. The program, when executed by a processor, may implement some or all of the steps recorded in any one of the foregoing method embodiments, and a function of any functional unit shown in FIG. 10.

An embodiment further provides a computer program product. When the computer program product runs on a computer or a processor, the computer or the processor is enabled to perform one or more steps in any one of the foregoing methods. When the foregoing units in the device are implemented in a form of a software functional unit and sold or used as an independent product, the units may be stored in the computer-readable storage medium.

In the foregoing embodiments, the descriptions in embodiments have respective focuses. For a part that is not described in detail in an embodiment, refer to related descriptions in other embodiments.

It should be understood that sequence numbers of the foregoing processes do not mean execution sequences in various embodiments. The execution sequences of the processes should be determined according to functions and internal logic of the processes, and should not be construed as any limitation on the implementation processes of embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments. The foregoing storage medium includes any medium that can store program code, such as a USB flash drive, a removable hard disk, a ROM, a RAM, a magnetic disk, or an optical disc.

In conclusion, the foregoing embodiments are merely intended for describing the technical solutions, but not for limiting this disclosure. Although this disclosure is described in detail with reference to the foregoing embodiments, a person of ordinary skill in the art should understand that modifications may still be made to the technical solutions described in the foregoing embodiments or equivalent replacements may still be made to some technical features thereof, without departing from the scope of the technical solutions of embodiments.

What is claimed is:

1. A storage apparatus comprising:
   a storage device comprising an access queue and configured to:
      receive, using the access queue, access requests of clients, wherein the clients comprise a first client, and wherein the access requests comprise a first access request corresponding to the first client;
      execute the first access request to obtain a processing result; and
      return the processing result; and
   a network device configured to:
      receive the access requests from the clients;
      connect the storage device to the clients;
      allocate local identifiers to client identifiers carried in the access requests, wherein the local identifiers uniquely identify the clients;
      replace the client identifiers carried in the access requests with the local identifiers;
      send the access requests comprising the local identifiers to the access queue;
      receive the processing result from the storage device;
      return the processing result to the first client; and
      record a mapping relationship between the client identifiers and the local identifiers using a table,
      wherein the table is a hash table,
      wherein in the hash table a keyword of an application server is at least one of the local identifiers, and
      wherein a value of the application server is at least one of the client identifiers.

2. The storage apparatus of claim 1, wherein the network device is further configured to:
   store a correspondence between the access queue and information about the clients; and
   further send the access requests based on the correspondence.

3. The storage apparatus of claim 2, wherein the information is connection information from when the network device establishes connections to the clients, and wherein the network device is further configured to:
   determine, when receiving the access requests, the access queue based on the connection information; and
   send the connection information to the access queue.

4. The storage apparatus of claim 2, wherein the information is connection information from when the network device establishes connections to the clients.

5. The storage apparatus of claim 3, wherein the network device is further configured to establish remote direct memory access (RDMA) connections with the clients.

6. A method implemented by a network device and comprising:
   receiving access requests from clients, wherein the clients comprise a first client, and wherein the access requests comprise a first access request corresponding to the first client;
   connecting a storage device to the clients;
   allocating local identifiers to client identifiers carried in the access requests, wherein the local identifiers uniquely identify the clients;
   replacing the client identifiers carried in the access requests with the local identifiers;
   sending the access requests comprising the local identifiers to an access queue of the storage device;
   receiving, from the storage device, a processing result that is based on execution of the first access request;
   returning the processing result to the first client; and
   recording a mapping relationship between the client identifiers and the local identifiers using a table,
   wherein the table is a hash table,
   wherein in the hash table a keyword of an application server is at least one of the local identifiers, and
   wherein a value of the application server is at least one of the client identifiers.

7. The method of claim 6, further comprising:

storing a correspondence between the access queue and information about the clients; and further sending the access requests based on the correspondence.

8. The method of claim 7, wherein the information is connection information from when the network device establishes connections to the clients, and wherein the method further comprises:

determining, when receiving the access requests, the access queue based on connection information; and sending the connection information to the access queue.

9. The method of claim 7, wherein the information is connection information from when the network device establishes connections to the clients.

10. The method of claim 8, further comprising establishing remote direct memory access (RDMA) connections with the clients, and wherein the connection information is a queue pair (QP) from when the network device establishes the RDMA connections.

11. A network device comprising:

a memory configured to store instructions; and one or more processors coupled to the memory and configured to execute the instructions to cause the network device to:

receive access requests from clients, wherein the clients comprise a first client, and wherein the access requests comprise a first access request corresponding to the first client;

connect a storage device to the clients;

allocate local identifiers to client identifiers carried in the access requests, wherein the local identifiers uniquely identify the clients;

replace the client identifiers carried in the access requests with the local identifiers;

send the access requests comprising the local identifiers to an access queue of the storage device;

receive, from the storage device, a processing result that is based on the first access request;

return the processing result to the first client; and record a mapping relationship between the client identifiers and the local identifiers using a table, wherein the table is a hash table, wherein in the hash table a keyword of an application server is at least one of the local identifiers, and wherein a value of the application server is at least one of the client identifiers.

12. The network device of claim 11, wherein the one or more processors are further configured to execute the instructions to cause the network device to:

store a correspondence between the access queue and information about the clients; and further send the access requests based on the correspondence.

13. The network device of claim 12, wherein the information is connection information from when the network device establishes connections to the clients, and wherein the one or more processors are further configured to execute the instructions to cause the network device to:

determine, when receiving the access requests, the access queue based on connection information; and sending the connection information to the access queue.

14. The network device of claim 12, wherein the information is connection information from when the network device establishes connections to the clients.

15. The network device of claim 13, wherein the one or more processors are further configured to execute the instructions to cause the network device to establish remote direct memory access (RDMA) connections with the clients.

16. The network device of claim 15, wherein the connection information is a queue pair (QP) from when the network device establishes the RDMA connections.

17. The network device of claim 13, wherein the one or more processors are further configured to execute the instructions to cause the network device to determine, based on the connection information, the first client.

18. The network device of claim 14, wherein the one or more processors are further configured to execute the instructions to cause the network device to:

obtain a first local identifier of the local identifiers and from the processing result;

determine, based on the first local identifier, first connection information corresponding to the first client; and further return the processing result to the first client based on the first connection information.

19. The storage apparatus of claim 3, wherein the network device is further configured to determine, based on the connection information, the first client.

20. The storage apparatus of claim 19, wherein the storage device is further configured to return the connection information to the network device when returning the processing result.

21. The storage apparatus of claim 4, wherein the network device is further configured to:

obtain a first local identifier of the local identifiers and from the processing result;

determine, based on the first local identifier, first connection information corresponding to the first client; and further return the processing result to the first client based on the first connection information.

22. The storage apparatus of claim 5, wherein the connection information is a queue pair (QP) from when the network device establishes the RDMA connections.

23. The method of claim 8, further comprising determining, based on the connection information, the first client.

24. The method of claim 9, further comprising:

obtaining a first local identifier of the local identifiers and from the processing result;

determining, based on the first local identifier, first connection information corresponding to the first client; and further returning the processing result to the first client based on the first connection information.

* * * * *